United States Patent [19]
Kuhn

[11] 3,750,006
[45] July 31, 1973

[54] VOLTAGE REGULATORS FOR ALTERNATING CURRENT GENERATORS

[75] Inventor: Edgar Kuhn, Gerlingin, Germany

[73] Assignee: Robert Bosch GmbH, Stuttgart, Germany

[22] Filed: May 22, 1972

[21] Appl. No.: 255,447

Related U.S. Application Data

[63] Continuation of Ser. No. 864,601, Oct. 8, 1969.

[52] U.S. Cl. .................. 322/28, 307/275, 322/91, 322/93
[51] Int. Cl. ........................................... H02p 9/30
[58] Field of Search .................... 322/28, 91, 93; 318/345; 307/275

[56] References Cited
UNITED STATES PATENTS

| | | | |
|---|---|---|---|
| 3,260,917 | 7/1966 | Shimwell et al. | 322/91 UX |
| 3,400,318 | 9/1968 | Hill | 322/93 X |
| 3,476,993 | 11/1969 | Aldrich et al. | 317/235 AB X |
| 3,059,169 | 10/1962 | Raver et al. | 322/95 |
| 3,471,716 | 10/1969 | Dinger | 307/275 X |

Primary Examiner—J. D. Miller
Assistant Examiner—H. Huberfeld
Attorney—Michael S. Striker

[57] ABSTRACT

A voltage regulating arrangement in which an alternating current generator excited through permanent magnetic means, has its output winding connected to a triac. The output winding of the generator is also connected to a rectifying bridge which converts the A.C. output of the generator into corresponding D.C. current. The rectifier output is applied to a voltage divider which, in turn, feeds a zener diode serving as a voltage reference device. The control electrode of the triac is connected to the zener diode, so that when the output voltage of the rectifier exceeds a predetermined magnitude, the triac is made to conduct.

13 Claims, 5 Drawing Figures

PATENTED JUL 31 1973 3,750,006

INVENTOR
Edgar KUHN
By his ATTORNEY

VOLTAGE REGULATORS FOR ALTERNATING CURRENT GENERATORS

This is a continuation, of application Ser. No. 864,601, filed Oct. 8, 1969.

BACKGROUND OF THE INVENTION

The present invention resides in a voltage regulator for a alternating current generator excited through permanent magnets. A rectifying circuit is connected to the output of the alternating current generator for connecting to a direct power system and in particular to a battery.

Generators which are excited through permanent magnetic means are very rugged and require little maintenance since they have no parts which are subject to wear, with the exception of the bearings of the rotor. Such generators are, for this reason, ideal current generators for motor vehicles, since the D.C. voltage for charging the batteries may be readily realized through rectifiers connected to the output terminals of the A.C. generator. These generators have, however, the disadvantage that the output voltage varies over wide limits in accordance with load and rotational speed. With a generator of nominal 12 volts, for example, an output voltage exceeding 200 volts may appear at high speeds and low loading. The rectified output voltage of such a generator must, thereby, be regulated, when the generator is to be used in motor vehicles. Without such regulation, attached apparatus as, for example, searchlights and communication equipment may be rapidly destroyed through excess voltages.

It is known in the art to regulate the rectified output voltage of such a generator through an arrangement in which a portion of the rectifier is designed as a controllable semi-conductor rectifier. The semi-conductor rectifiers are cut-off or become non-conducting when the voltage across the D.C. lines become too high. The generator, in that event, operates in idling condition. This known arrangement operates exceptionally satisfactory and has moreover a standard circuit in this field of application. Because of the required voltages to be applied to the semi-conductors, however, a considerable amount of complex equipment is required. When using generators for small motorized bicycles or motor cycles, or applications involving tree-cutting or wood-cutting, or snow plowing, such a complex amount of equipment is not practical.

It is an object of the present invention, therefore, to provide a voltage regulator which is simpler and more economical to fabricate than the known voltage regulator.

The object of the present invention is achieved by connecting a bidirectional thyristor in the form of a triac in parallel with at least a portion of the output winding of the A.C. generator. The triac is controlled through switching circuit means made dependent upon the voltage across the D.C. power line to be regulated. The arrangement is such that the triac is made to conduct when the voltage across the D.C. line exceeds a predetermined value. As a result of this arrangement, an exceptionally simple design and construction is realized.

A further simplification of the arrangement in accordance with the present invention, is realized when the triac is connected in parallel with one partial winding of two partial windings connected in series and magnetically coupled to each other, and comprising the output winding of the alternating current generator which is excited through permanent magnetic means.

The center tap or junction of the two partial windings may be connected to the D.C. lines, and the switching means for controlling the triac is also connected to these lines. The two partial windings are magnetically coupled to each other through the laminated core or iron of the generator. As a result of such coupling, the short-circuiting of one partial winding also acts as a short-circuit for the other partial winding. Through such design, it is possible to save two diodes, since with a center tap rectifying circuit, or full-wave rectifier circuit with center tap output winding, only two diodes for full-wave rectification are required. The circuitry becomes thereby exceptionally simple and excess voltages across the load connected to the D.C. power lines, are avoided.

SUMMARY OF THE INVENTION

A voltage regulating arrangement in which the output winding of an alternating current generator is connected across a triac, the control electrode of which leads to a voltage reference device in the form of a zener diode. A rectifying bridge is also connected to the output winding of the A.C. generator and provides a D.C. reference voltage for the zener diode, through a voltage divider constructed of a series of resistors. A transistor is connected between the control electrode of the triac and the zener diode. The alternating current generator is of the type excited through permanent magnetic means and is particularly adapted for the operation of motor vehicles and the charging of storage batteries therein. In one embodiment of the arrangement of the voltage regulator, the triac is connected across a partial winding of the output winding of the generator which is subdivided into two series-connected partial windings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
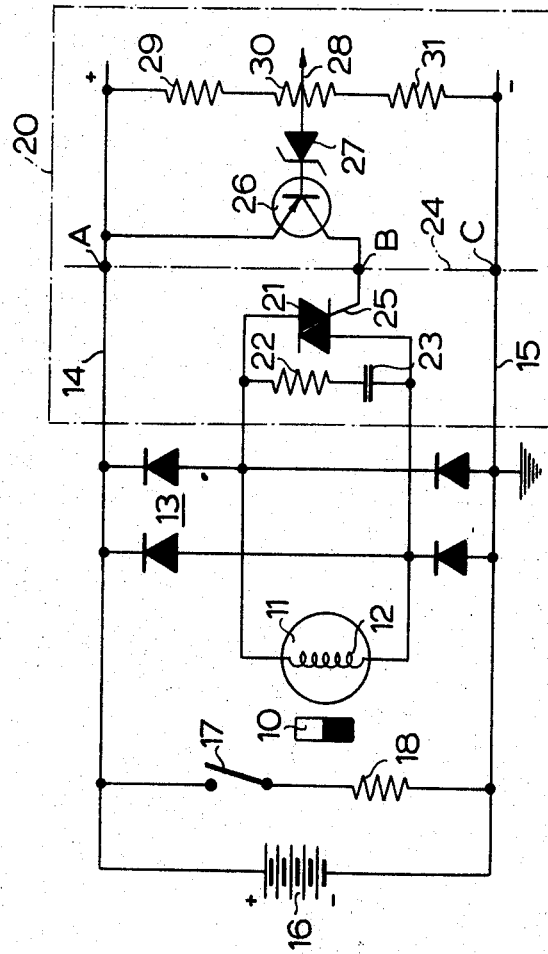
FIG. 1 is an electrical schematic diagram and shows the voltage regulating arrangement including an alternating current generator with rectifying bridge, in accordance with the present invention.

Referring to the drawing, and in particular to FIG. 1, an A.C. generator 11 is excited through permanent magnets 10. The A.C. generator 11 feeds a D.C. network through its output winding 12 and a full-wave rectifier 13 connected to the output winding. A battery 16 is connected between the positive line 14 and the negative line 15, and a load 18 may be connected across the line through a switch 17.

A bidirectional thyristor 21 designed in the form of a triac is connected across the output winding 12, and forms a part for the voltage regulator 20. A resistor 22 and capacitor 23 are connected in series, and this series combination is, in turn, connected across the triac 21.

For the purpose of switching the triac 21, the circuit to the right of the dash-dot line is provided. In place of this circuitry to the right of the dash-dot line 24 in FIG. 1, the circuitry shown in FIGS. 3 to 5 may also be applied. The arrangement of FIG. 1, however, has shown itself to be very advantageous.

The control electrode 25 of the triac 21 is connected, through the terminal B, to the collector of a transistor 26 which is a pnp transistor within the voltage regulator 20. The emitter of this transistor 26 is connected to the positive voltage line 14, through the terminal A. The base of the transistor 26, is on the other hand connected to the cathode of a voltage reference diode 27 which is in the form of a zener diode. The anode of this diode 27 is connected to the tap of a voltage divider consisting of the three resistors 29, 30, and 31. This voltage divider is connected to the positive line 14, through the terminal A, and, at the same time, it is also connected to the negative voltage line 15, through the terminal C.

In the operation of the circuitry of FIG. 1, in the initial stage of motion, the generator 11 rotates at low speeds, so that the output voltage lies within the region of the nominal voltage of, for example, 12 volts. The battery 16 receives, thereby, charging current through the bridge rectifier 13. The zener diode 27 is, accordingly, cut-off or non-conducting, as is the transistor 26. The control electrode 25 of the triac 21 receives, thereby, no current so that the triac is also cut-off.

If, however, the voltage across the D.C. lines 14 and 15 increases for higher rotational speeds of the generator or highly charged battery 16, the zener diode 27 becomes conducting when such voltage across the lines 14 and 15 reaches a predetermined value. The transistor 26 acquires, thereby, base current and becomes, as a result, conducting so that the control electrode 25 of the triac 21 also receives current. This bidirectional element becomes consequently conducting which implies that the positive as well as the negative half-wave of the applied A.C. voltage becomes short-circuited. The control current for the triac 21 is delivered by the generator 11.

The voltage across the D.C. lines 14 and 15, consequently, drops again so that the zener diode 27 is again cut-off and the triac 21 is also cut-off when the applied A.C. voltage passes through zero. This switching operation or circuit operation is repeated continuously and provides a very constant voltage across the D.C. lines 14 and 15.

Figure 2:
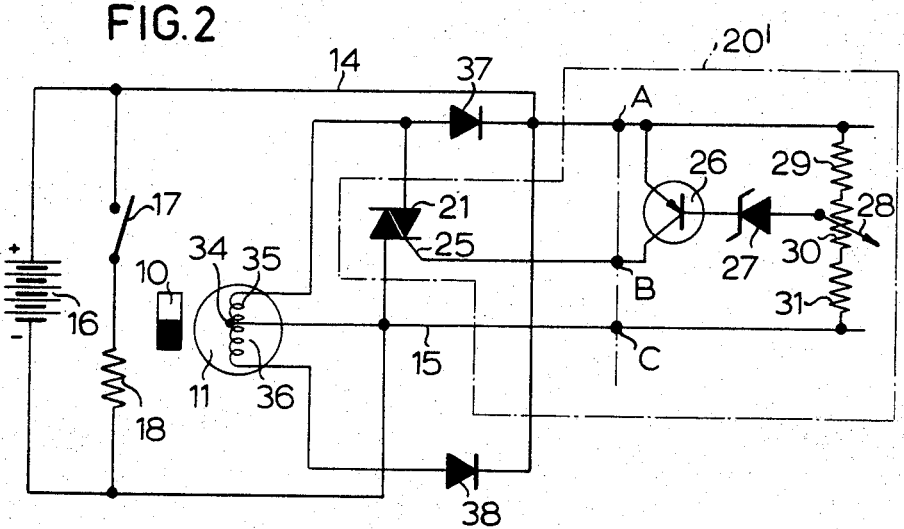
FIG. 2 is another embodiment of the arrangement of FIG. 1 in which the output winding of the alternating current generator is subdivided into two series-connected partial windings.

FIG. 2 shows a circuit arrangement which is simplified compared to that shown in FIG. 1. The output winding of the generator 11, in this arrangement, is provided with a center tap 34, so that two partial windings 35 and 36 result. The free ends of these windings are each connected to a diode 37 and 38 leading to the positive line 14. The negative D.C. line 15, on the other hand, is connected to the center tap 34.

The voltage regulator in this arrangement of FIG. 2, is denoted by the reference numeral 20 and is designed, in principle, similar to the voltage regulator 20 of FIG. 1. The triac 21, in this case, is connected, however, across the partial winding 35 of the output windings 35 and 36. The series circuit of elements 22 and 23 which comprises an R-C circuit, can also be provided in conjunction with this arrangement of FIG. 2.

In operation of the circuit arrangement of FIG. 2, the triac 21 is cut-off for as long as the voltage across the D.C. lines 14 and 15 is below the desired value, corresponding to low rotational speeds or severely discharged battery 16. This is based on the condition that the zener diode 27 and thereby also the transistor 26 are not conducting. The output voltage of the generator 11 becomes rectified and charges the battery 16.

The tap 28 of the voltage divider consisting of resistors 29, 30 and 31 is adjusted or set so that when the desired voltage across the D.C. lines 14 and 15 is exceeded, the zener diode 27 becomes conducting and the control electrode 25 of the triac 21 receives current through the transistor 26 which is made now conducting. The control current applied to the electrode 25 causes the triac 21 to become bidirectionally conducting, which implies that the positive and negative half-waves of the applied alternating voltage becomes substantially short-circuited.

The partial windings 35 and 36 are very closely coupled to one another through the laminated core of the generator 11. As a result, the short-circuiting of the partial winding 35 also acts as a short-circuit upon the partial winding 36.

This feature is of importance, since as a result of this condition, it is possible to connect the triac 21 only across one partial winding. Thus, it is not essential, therefore to connect the triac 21 in parallel with the entire output winding made of the partial windings 35,36. The control of the triac 21 is made, thereby, highly simplified, since its anode is directly connected to the negative D.C. line 15, and the control electrode 25 can have control current applied to it in a simple manner. The voltage loading of the triac 21 is also made hereby substantially smaller than in the second case, and the firing of the triac is made more reliable.

The short-circuiting of the partial winding 35, consequently, is also substantially the same as a short-circuit of the two partial windings 35 and 36 together, and thereby leads to a drop of the voltage across the D.C. lines 14 and 15. As a result, the zener diode 27 and thereby the transistor 26, as well as the triac 21, become again cut-off or non-conducting, and the foregoing circuit operation may be repeated. The voltage across the D.C. lines 14 and 15 can be maintained constant, in this manner, within narrow limits.

Figure 3:
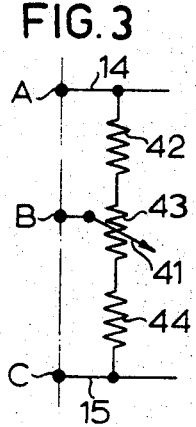
FIG. 3 to FIG. 5 are electrical schematic diagrams of different embodiments of the arrangement of FIGS. 1 and 2.

FIG. 3 shows a very simple circuit arrangement for controlling the triac 21. This circuit arrangement of FIG. 3 may be used in conjunction with the circuits of FIGS. 1 or 2. In this arrangement of FIG. 3, control electrode 25 of the triac 21 becomes connected to the tap 41 through the terminal B. The tap 41 belongs to a voltage divider composed of resistors 42, 43, and 44, and connected across the D.C. lines 14 and 15. The control path of the triac 21 becomes first conducting when the tap 41 acquires a predetermined potential. As a result, voltage regulation is made possible with this simple circuitry. The voltage is, however, affected in this case through temperature variations and cannot be maintained, thereby, satisfactorily constant. Accordingly, this circuit can only be used in conjunction with very simple regulators.

Figure 4:
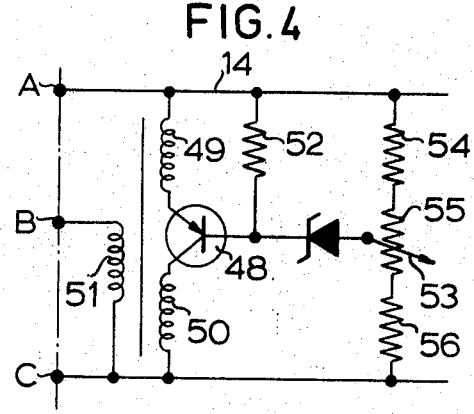

FIG. 4 shows a blocking oscillator which emits pulses between the terminals B and C, when the voltage at its input exceeds a predetermined level. A pnp transistor 48 has its emitter connected with the positive line 14, through a coil 49, whereas the collector of this transistor 48 is connected, through the coil 50, to the negative line 15. The base of the transistor 48 is connected to the cathode of the zener diode 57, and a resistor 52 is connected between the base of the transistor, and the positive D.C. line 14. The anode of the zener diode 51 is, in turn, connected to the tap 53 of a voltage divider consisting of the resistors 54, 55 and 56. An output winding coupled with the coils 49 and 50, is connected across the terminals B and C.

In the operation of FIG. 4, the zener diode 51 becomes conducting when the voltage across the D.C. lines 14 and 15 exceeds a predetermined value. When this condition occurs, the transistor 48 receives pulse-shaped collector current, through the coupling of the windings 49 and 50. As a result, pulses become available at the output winding 57 for the purpose of firing the triac 21. Accordingly, the triac 21 is made conducting for as long as the blocking oscillator oscillates. This circuitry of FIG. 4 is particularly adapted for generators of larger power capacities.

Figure 5:
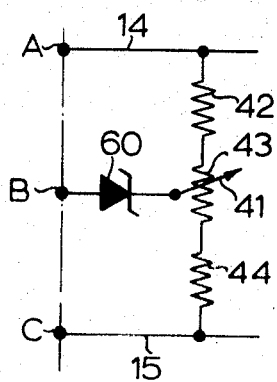

FIG. 5 shows a circuit arrangement in which a zener diode 60 is provided in addition to the circuit elements of FIG. 3 which are designated here with the same reference numerals as therein. The zener diode 60 serves here as a voltage reference element and becomes first conductive when the voltage between the D.C. lines 14 and 15 exceeds a predetermined value and leads subsequently to the firing of the triac 21. This zener diode 60 is connected between the tap 41 of the voltage divider, and the terminal B.

The regulators in accordance with the present invention are also similarly adapted for regulating of polyphase generators, provided the necessary modifications that are required, are carried out.

It will be understood that each of the elements described above, or two or more together, may also find a useful application in other types of constructions differing from the types described above.

While the invention has been illustrated and described as embodied in voltage regulators for alternating current generators, it is not intended to be limited to the details shown, since various modifications and structural changes may be made without departing in any way from the spirit of the present invention.

What is claimed as new and desired to be protected by Letters Patent is set forth in the appended claims:

1. A voltage regulating arrangement for an alternating current generator having an output winding furnishing an A.C. voltage, comprising, in combination, full-wave rectifying means having input terminals directly connected to said output winding and having output terminals, for converting said A.C. voltage at said input terminals into a corresponding D.C. voltage at said output terminals; load means connected to said output terminals of said rectifying means, thereby drawing a load current; bidirectional thyristor means connected directly in parallel with at least a part of said output winding of said alternating current generator; switching means connected to said thyristor means for controlling the operation of said thyristor means as a function of the D.C. voltage at the output of said rectifying means so that said thyristor means conducts when said D.C. voltage at the output of said rectifying means exceeds a predetermined magnitude and thereby shorts out said part of said output winding during both halves of the alternating current output, the short-circuit current of said part of said output winding passing only through said bidirectional thyristor means, said full-wave rectifying means being free from said short-circuit current, said bidirectional thyristor means being free of said load current.

2. The voltage regulating arrangement as defined in claim 1 wherein the output winding of said generator is subdivided into two series-connected partial windings magnetically coupled to each other, said bidirectional thyristor means being connected in parallel with one of said partial windings.

3. The voltage regulating arrangement as defined in claim 1 wherein said bidirectional thyristor means comprises a triac connected across said output winding of said generator, said rectifying means comprising a rectifying bridge circuit.

4. The voltage regulating arrangement as defined in claim 1 including voltage reference diode means having an applied voltage dependent upon the D.C. voltage output of said rectifying means, said bidirectional thyristor means comprising a triac with control electrode connected to said voltage reference diode means.

5. The voltage regulating arrangement as defined in claim 4 wherein said voltage reference diode means comprises a zener diode.

6. The voltage regulating arrangement as defined in claim 4 including transistor means with control path connected in series with said voltage reference diode means, the switching path of said transistor being connected to the control electrode of said triac.

7. The voltage regulating arrangement as defined in claim 1 including oscillator means connected to the D.C. output of said rectifying means and being regulated by the voltage magnitude appearing across said output of said rectifying means, said bidirectional thyristor means comprising a triac with control electrode connected to the output of said oscillator means.

8. The voltage regulating arrangement as defined in claim 7 wherein said oscillator means comprises a blocking oscillator.

9. The voltage regulating arrangement as defined in claim 1 wherein said bidirectional thyristor means comprises a triac.

10. The voltage regulating arrangement as defined in claim 1 including permanent magnetic means for exciting said alternating current generator.

11. The voltage regulating arrangement as defined in claim 1 including battery means connected across the direct current output terminals of said rectifying means.

12. The voltage regulating arrangement as defined in claim 2 wherein said rectifying means has two D.C. output terminals, and said bidirectional thyristor means comprises a triac having two terminals and a control electrode, one of said terminals being connected to the junction between said partial windings of the output winding of said generator, said junction being a D.C. output terminal of said rectifying means, the other terminal of said triac being connected to one terminal of one partial winding opposite said junction of said partial windings, and said control electrode being connected to said switching means.

13. The voltage regulating arrangement as defined in claim 12 wherein said rectifying means includes respective diode means connected between the other of said two output terminals and the end, remote from said junction, of each of said partial windings.

* * * * *